United States Patent
Fermigier et al.

(10) Patent No.: US 8,210,677 B2
(45) Date of Patent: Jul. 3, 2012

(54) PATCH FOR MODIFICATION OF THE POWER OF AN OPTICAL COMPONENT

(75) Inventors: Bruno Fermigier, Charenton-le-Pont (FR); Francois Guilhaumon, Charenton-le-Pont (FR); Matthieu Koscher, Charenton-le-Pont (FR); Sylvie Maze, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 404 days.

(21) Appl. No.: 12/303,630

(22) PCT Filed: May 29, 2007

(86) PCT No.: PCT/FR2007/051340
§ 371 (c)(1),
(2), (4) Date: May 6, 2009

(87) PCT Pub. No.: WO2007/141440
PCT Pub. Date: Dec. 13, 2007

(65) Prior Publication Data
US 2010/0007846 A1    Jan. 14, 2010

(30) Foreign Application Priority Data
Jun. 7, 2006 (FR) ................................ 06 05059

(51) Int. Cl.
*G02C 7/02* (2006.01)
*G02B 3/08* (2006.01)
(52) U.S. Cl. ............... 351/159.48; 351/159.45; 359/743
(58) Field of Classification Search .................. 359/742, 359/743; 351/159, 168, 159.45, 159.48
See application file for complete search history.

(56) References Cited

U.S. PATENT DOCUMENTS

| | | | |
|---|---|---|---|
| 3,904,281 A * | 9/1975 | Jampolsky | ............. 351/159 |
| 4,070,105 A | 1/1978 | Marzouk et al. | |
| 4,146,306 A | 3/1979 | Wallach et al. | |
| 4,547,049 A * | 10/1985 | Cotie | ............. 351/159 |
| 4,828,558 A * | 5/1989 | Kelman | ............. 623/6.13 |
| 5,104,212 A | 4/1992 | Taboury et al. | |
| 5,982,543 A | 11/1999 | Fiala et al. | |
| 6,170,952 B1 | 1/2001 | La Haye et al. | |
| 2006/0109554 A1 | 5/2006 | Chen | |

FOREIGN PATENT DOCUMENTS

| | | |
|---|---|---|
| JP | 01 243016 | 12/1989 |
| JP | 06 174904 | 9/1994 |
| WO | 97/10527 | 3/1997 |

OTHER PUBLICATIONS

The Fresnel Prism and Lens Co., LLC, *3M Press-On Optics*, Retrieved from URL:http://www.fresnelprism.com/3MPOP.html, on Mar. 24, 2006(1 page).

* cited by examiner

*Primary Examiner* — Scott J Sugarman
(74) *Attorney, Agent, or Firm* — Occhiuti Rohlicek & Tsao LLP

(57) ABSTRACT

A disk enabling modification of the power of an optical component consists of a Fresnel lens. The disk is initially formed with a general rounded shape which corresponds to the shape of the optical component. In this way, the disk does not lose its shape or does not lose it very much when it is applied against the component. It does not cause image distortion or optical aberration when an object is observed through the component provided with the disk. Such a disk is particularly adapted to obtain correction of ametropia or to a solar mask initially lacking optical power.

32 Claims, 2 Drawing Sheets

PATCH FOR MODIFICATION OF THE POWER OF AN OPTICAL COMPONENT

CROSS-REFERENCE TO RELATED APPLICATIONS

This application is the National Stage of International Application No. PCT/FR2007/051340, filed on May 29, 2007, which claims the priority of French Application No. 0605059, filed on Jun. 7, 2006. The contents of both applications are hereby incorporated by reference in their entirety.

The present invention relates to a patch intended to be fixed to a face of an optical component to modify an optical power thereof. It also relates to an optical element and a pair of glasses that incorporate such a patch, and a method of fabricating the patch.

It may be useful to adapt the power of an optical component according to a particular use of the latter. This may be the case, for example, to adapt an eyeglass of sunglasses to the ametropia of a wearer of this eyeglass. In the context of the invention, the power of an optical component describes the vergence of this element, and is commonly expressed in diopters.

Producing a patch of transparent material that is intended to be applied to a face of an optical component, to modify the power of the latter, is known. The patch comprises a Fresnel lens which is formed by a series of Fresnel zones arranged one inside the other parallel to a smooth face of the patch. These zones present jumps in height between two successive zones that are greater than five times an average wavelength of visible light, the jumps in height being measured in a direction perpendicular to the tangent line of the smooth face. In these conditions, the patch itself has an optical power that results from the refraction of the light rays on the two faces of the patch in each Fresnel zone. This optical power of the patch is added to that of the optical component to which it is applied. The use of a form of Fresnel lens reduces the thickness of the patch to obtain a fixed power modification, compared to an additional lens that would be attached to the optical component.

These patches have an initially flat shape, and must be bulged when they are applied onto the curved surface of a lens or an ophthalmic glass. This deformation of the patch when it is applied onto the lens or onto the ophthalmic eyeglass produces distortions of an image formed through the lens or the eyeglass, once the latter is provided with the patch, and optical aberrations. Such defects are particularly objectionable for an ophthalmic application, since an object then appears with a variable deformation when it is observed through different points of the eyeglass. In particular, the image distortions vary dynamically when the observed object moves in the field of vision or when the wearer of the eyeglass turns the head to follow the object being watched. These image distortions are then very objectionable. Finally, these defects are all the greater when the optical power modification provided by the patch is high.

Furthermore, the existing patches are designed to be applied to an eyeglass by turning the face of the patches that comprises the jumps in height away from the eyeglass. In practice, the smooth face of each patch, which is situated on the side opposite to the jumps in height, allows for an adhesion of the patch to the eyeglass by capillarity or by electrostatic effect. The face of the patch that is exposed to dirt is then the one that comprises the jumps in height. Now, the latter cannot be simply cleaned because of its relief, and the deposits of dirt that form in the jumps in height produce a significant light diffusion. They also strongly degrade the quality of an image formed through the eyeglass provided with the patch, by locally distorting the light wavefront.

Also known from the document US 2006/0109554 is a diffractive optical lens comprising a bottom surface having an aspherical curve and a top surface having a quasi-parabolic curve, said top surface further including a plurality of diffractive grooves. These diffractive grooves are fashioned in accordance with a Fresnel diffraction formula. The optical lenses as described are intended to be used as instrument lenses, of the type of lenses that can be found in electronic appliances such as cameras, projectors or even scanners. These optical lenses constitute diffractive optical elements. Such lenses cannot be used in ophthalmic optics, because of their design. In practice, a diffractive lens adds chromatism, the latter increasing with the corrective power that is created at the level of the lens. Because of this, the use of diffractive lenses as described in this patent application is not suitable as a solution to the technical problem addressed by the present invention.

One object of the present invention is to propose a patch for modifying optical power that does not present the drawbacks mentioned hereinabove.

To this end, the invention proposes a patch of the type described hereinabove, and which is intended to be fixed to a curved surface of an optical component to modify the power thereof. The term "modify" should be understood to mean either the addition of an optical power to an optical component that does not have power, or a variation of the optical power to an optical component that already has its own optical power. According to the invention, the patch has a generally bulging shape in addition to the jumps in height that are present between the Fresnel zones. In other words, the smooth face of the patch has an initial curvature that substantially corresponds to the shape of the curved surface of the optical component intended to receive said patch. The face of the patch that comprises the jumps in height also has a mean curvature that also corresponds to said curved surface of the optical component. It is the face of the patch that comprises the jumps in height which is intended to be placed in contact with the curved surface of the optical component.

A patch for modifying optical power as claimed by the invention is therefore not flat, but presents a generally bulging shape, for example substantially spherical, in addition to the jumps in height. Thanks to this initially bulging shape, the patch is only slightly deformed, or not deformed, when it is applied to the surface of an optical component that is itself substantially bulging. The patch then creates little or no image distortion, or optical aberration, when an object is observed through the optical component provided with the patch. The comfort in using the optical component is then not degraded by the patch, even for a patch that produces a significant optical power modification that may be greater than 30 diopters as an absolute value at the level of the patch itself.

In the context of the invention, the term "optical component" should be understood to mean visors such as helmet visors and ophthalmic lenses. The term "ophthalmic lenses" should be understood to mean lenses that adapt notably to a spectacle frame or a mask such as a ski mask or a diving mask, and masks whose function is to protect the eye and/or correct the vision, these lenses being chosen from afocal, unifocal, bifocal or varifocal lenses. The term "mask" such as sun mask, should be understood to mean a lens comprised of a single piece and intended to be positioned in front of both eyes. Such ophthalmic lenses or visors may, if necessary, be tinted. These optical components in the context of the invention may optionally have one or more functions provided by the application of one or more coatings and being able notably to be chosen from photochromic, antireflecting, dirt resistant, anti-impact, scratchproof, polarizing and antistatic coatings. The invention is particularly suited to corrective or noncorrective ophthalmic lenses.

According to an additional characteristic of the invention, the jumps in height between successive Fresnel zones are situated on a generally convex face of the patch. When such a patch is applied against the rear, or concave, face of an ophthalmic lens, the face of the patch that is exposed to dirt is the smooth face. It can therefore be easily cleaned. The face of the patch that comprises the jumps in height is then protected from the dirt by the lens against which it is applied. The modification in the optical power that is provided by the patch is then permanent, and is not corrupted by deposits of dirt. The user of spectacles or of a mask comprising such ophthalmic lenses provided with this patch will immediately appreciate the practical benefit thereof in his or her daily life.

According to yet another characteristic of the invention, the mean radius of curvature of the patch is between 135 mm (millimeters) and 53 mm. Such a radius of curvature corresponds to the shape of the rear face, or concave face, of numerous spectacle lenses.

According to an improvement of the invention, the jumps in height between successive Fresnel zones have substantially constant magnitudes within a circle of 10 mm radius surrounding the optical center of the patch. The face of the patch that comprises the jumps in height then has a constant relief height in a central part of this face. This further contributes to ensuring that no image distortion nor optical aberration is produced by the patch when the latter is applied against an optical component on the side with the jumps in height. The invention also comprises a patch in which the jumps in height between successive Fresnel zones have substantially constant magnitudes over the entire surface of said patch. The invention thus comprises the different possible combinations between variable jump in height between Fresnel zone and constant jump in height between Fresnel zone constant over the entire surface or part of the surface of the patch.

The invention also relates to an optical element that comprises a base optical component and a patch as described previously, fixed to the component. Preferably, the face of the patch that comprises the jumps in height is facing the base component within the optical element, in order to protect this face against dirt. In particular, the patch may be fixed to the component by a layer of material having adhesive properties able to form a permanent cohesion between said patch and said optical component. This layer of material is then arranged between the two entities forming the optical element.

As described previously, the base optical component may be an ophthalmic lens. Preferably, such an ophthalmic lens is tinted or partially reflecting and, if necessary, has optical properties able to correct an ametropia. The patch is then almost invisible and does not reduce the esthetics of a pair of spectacles that comprises the lens, when it is applied to the concave face, or rear face, of the lens.

The invention also relates to a pair of spectacles that comprises at least one lens and a patch as described previously that is fixed to the lens. Preferably, the patch is fixed onto the rear face of the lens. Such a pair of spectacles may be of the ametropia-correcting spectacles type, tinted or otherwise, or of sunglasses or solar protection mask type, noncorrective in particular.

The invention finally relates to a method of fabricating a patch for modifying the optical power as described hereinabove, based on a thermoplastic material.

Other particular features and benefits of the present invention will become apparent from the description hereinbelow of exemplary and non-limiting embodiments, with reference to the appended drawings, in which.

Figure 5:
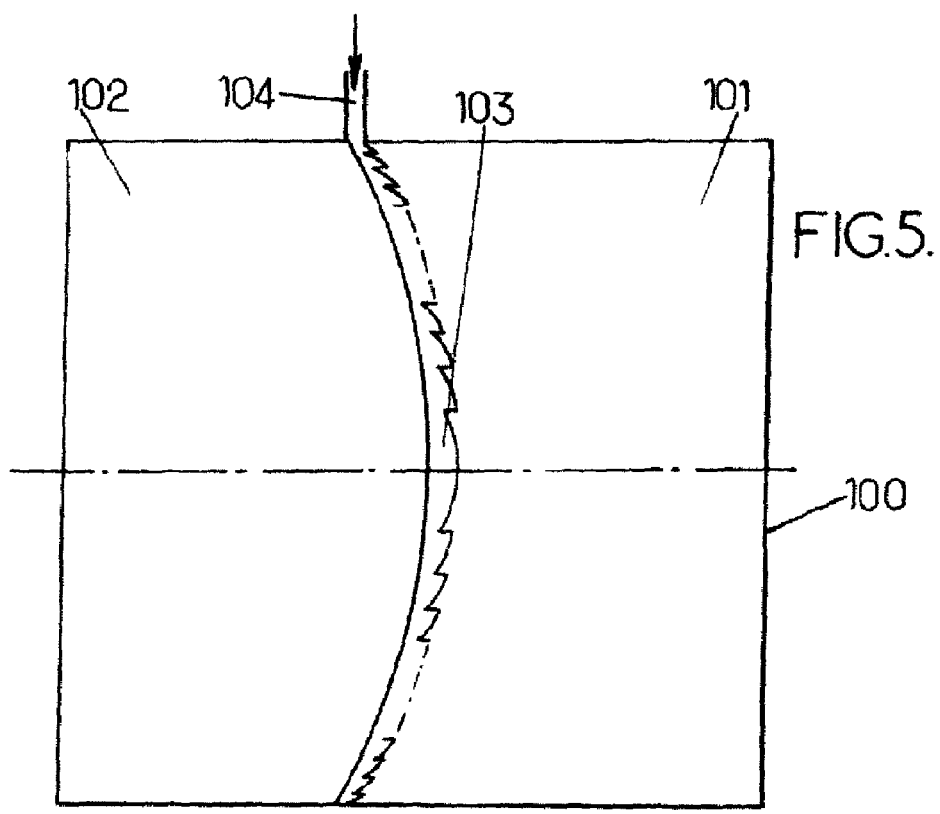

FIG. 5 diagrammatically illustrates the principle of fabrication of a patch according to the invention.

For the sake of clarity, the dimensions of the elements represented are not in proportion with actual dimensions or dimension ratios. Furthermore, identical references in different figures denote identical elements.

Figure 1A:
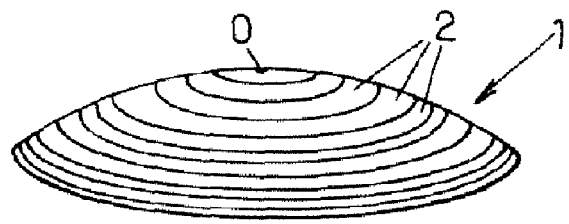
FIG. 1a is a perspective view of a patch according to the invention.
Figure 1B:
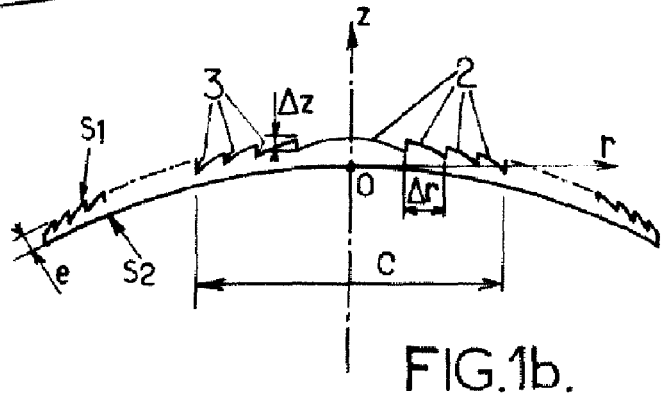
FIGS. 1b and 1c are respective cross-sectional views of two patches according to the invention.

According to FIGS. 1a and 1b, a patch 1 according to the invention has a generally bulging, or cup shape. Preferably, the patch has a spherical dome shape, with a mean radius of curvature that may be of the order of 66 mm (millimeters) for example. This mean radius of curvature is advantageously between 88 mm and 53 mm.

The patch 1 constitutes a Fresnel lens: it is formed by a succession of Fresnel zones that are arranged concentrically and contiguously, for example 100 to 200 zones. These zones, referenced 2 in the figures, are coaxial rings that are oriented and centered according to an optical axis denoted z. The axis z then passes through an optical center of the patch, which is situated on the latter and is denoted O. In a known manner, each Fresnel zone corresponds to a portion of lens, and the thickness of the patch 1 varies continuously within this zone in a radial direction, denoted r, in a plane perpendicular to the axis z. Between two successive zones 2, one of the surfaces of the patch 1 has a jump in height parallel to the axis z, referenced 3. Its magnitude is denoted $\Delta z$. It is specified that the jumps in height 3 that are present between successive zones 2 are superimposed on the general shape of the patch 1, this general shape being bulging, possibly almost spherical, according to the invention.

Preferably, the jumps in height 3 correspond to height discontinuities of the convex face of the patch 1, referenced S1. Between two successive jumps in height 3, a Fresnel zone 2 has a radial dimension that is denoted $\Delta r$, measured perpendicularly to the axis z. The concave face of the patch 1, referenced S2, is then smooth. e designates the average thickness of the patch 1, between the faces S1 and S2. It is measured perpendicularly to the face S2. Preferably, the thickness e is less than 2 mm and can be between 0.5 and 0.7 mm. The weight increase of an optical element that includes the patch 1, which is due to the latter, is then limited.

In order not to produce any light diffusion, any diffraction or any iridescence, or, so that these phenomena are not perceptible, the Fresnel zones 2 are dimensioned so that the magnitudes $\Delta z$ of the jumps in height 3 are at least equal to five times an average wavelength of visible light. For example, the magnitudes of the jumps in height 3 may be between 5 µm (micrometers) and 250 µm. In this way, because of the short coherence length of natural light, no interference is perceptible which would be produced between parts of a light beam that pass through different zones 2. In other words, the patch 1 has a purely refractive optical effect, which is linked to the shape of the surfaces S1 and S2 in each zone 2, and generates no visible diffractive effect. As described previously, the magnitudes of the jumps in height 3 between successive Fresnel zones may be variable over at least a part of the surface of the patch, while maintaining a profile thereof that is substantially spherical on the surface (S1). In this case, the magnitude $\Delta z$ is greater at the periphery of the patch than in its central zone. Thus, according to the invention, in the case where the jumps in height between successive Fresnel zones are variable over the entire surface (S1), then the magnitude of these jumps may be between 5 µm and 250 µm. In the case where the jumps in height between successive Fresnel zones are constant over the entire surface (S1), then they may be between 5 µm and 100 µm; in the case where the jumps in height between successive Fresnel zones have substantially constant magnitudes within a circle (C) of 10 mm radius surrounding the optical center of the patch (O), the magnitude in the circle (C) may be between 5 µm and 50 µm, and the variable magnitude of the jumps in height outside this circle (C) to a peripheral part of the lens may be between 5 µm and 250 µm.

The radial dimension $\Delta r$ of each zone 2 then depends on the optical power of the patch 1 and on the magnitude $\Delta z$ of the jumps in height 3. In the preceding conditions, and for an optical power of the patch 1 less than 12 diopters, $\Delta r$ may be between 10 µm and 2 mm.

Figure 1C:
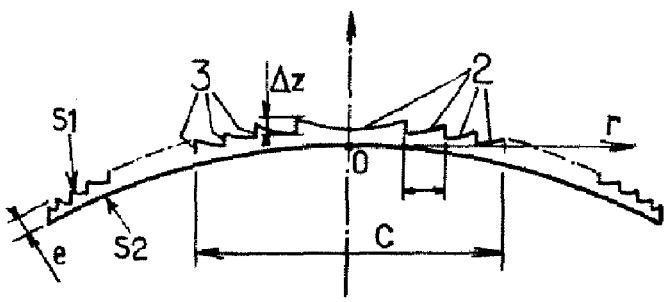

The patch 1 may have a positive or negative vergence, according to the direction of variation of its thickness in the direction r, within each Fresnel zone 2. FIGS. 1b and 1c respectively correspond to a convergent or divergent patch. The variation of the thickness of the patch within each zone 2 may be, in particular, a quadratic function of r.

Figure 2A:
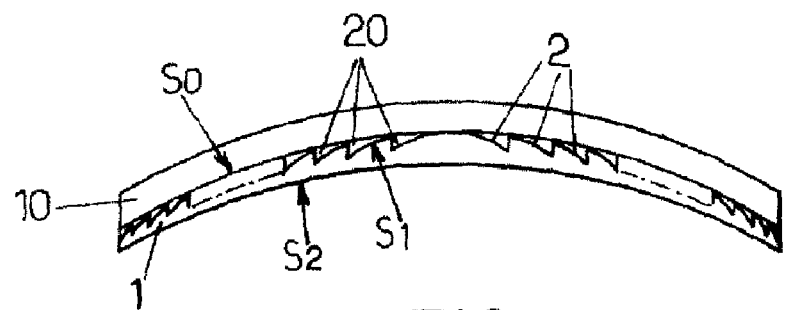
FIGS. 2a and 2b are cross-sectional views of two ophthalmic lenses, suitable for being arranged into a pair of spectacles, provided with patches according to FIGS. 1b and 1c.
Figure 2B:
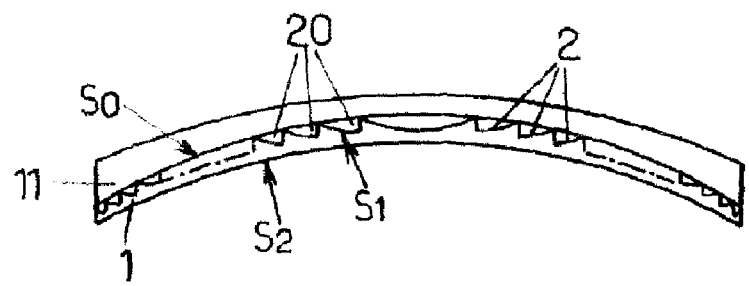

FIGS. 2a and 2b show two ophthalmic lenses that may be adapted to a pair of spectacles and that are provided, on their rear faces S0, or concave faces, with patches according to FIGS. 1b and 1c, respectively. It is understood that each of these patches may be used in the same way with the lens of the other figure, and that the combinations illustrated are taken purely as examples. The lens of FIG. 2a, referenced 10, may be a sun lens with a zero optical power, given that it has two parallel faces. The patch 1 then leads to it a non-zero power, which makes it possible to correct an ametropia defect of a wearer of the lens. In this way, the patch 1 may adapt any sun lens to a wearer having an ametropia. The pair of spectacles comprising such a lens 10 may then be chosen by the wearer according to its appearance, its coloring, or the shape of the associated frame. The lens of FIG. 2b, referenced 11, corresponds to a myopia correction, given that it is less thick at its center than at its periphery. The patch 1 then makes it possible to adapt the magnitude of the correction according to the degree of myopia of the wearer. In this case, the patch 1 is placed on the eyeglass 11 so as to superimpose the respective optical axes of the eyeglass and of the patch. An identical function is obtained with a hyperopia-correcting eyeglass.

Figure 3:
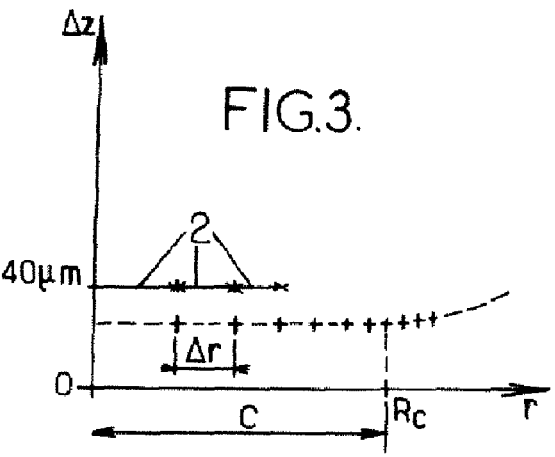
FIG. 3 is a diagram illustrating the variations of jumps in height for a patch according to the invention.

The patch 1 is applied onto the rear face S0 of the lens 10 or 11, which is smooth. This operation may be done directly by the practitioner on the pair of spectacles in which the lens is fitted on the frame chosen by the wearer. The jumps in height 3 preferably have substantially constant magnitudes within a circle C of radius $R_C$ surrounding the center O. In this way, the patch 1 may be applied more easily against the surface S0 of the lens, at least in a central area of the patch, within the circle C. FIG. 3 represents an example of variation of the magnitudes $\Delta z$ of the jumps in height 3 in the radial direction r. When r is less than the radius $R_C$ of the circle C, the magnitudes $\Delta z$ of the jumps 3 are constant and the radial dimension $\Delta r$ of the zones 2 reduces for increasingly greater zones 2. Beyond the value $R_C$, that is, in a peripheral part of the patch 1 outside the circle C, the jumps in height 3 may have magnitudes $\Delta z$ that increase, notably to avoid producing zones 2 that would have very short radial dimensions $\Delta r$. $R_C$ may be equal to 10 mm, for example, and the magnitudes $\Delta z$ of the jumps in height 3 may be equal to 40 µm within the circle C.

Figure 4:
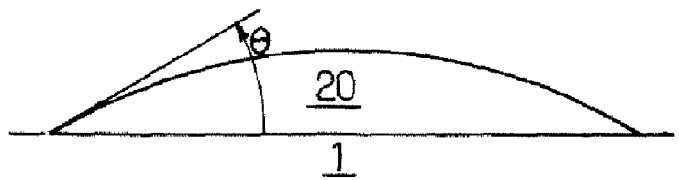
FIG. 4 illustrates a convention for measuring a wetting angle.

The patch 1 is glued onto the face SO of the lens 10 or 11, with a layer of adhesive material 20 arranged between the patch 1 and the lens. In order not to degrade the optical effect of the patch 1, the adhesive material 20 which is used advantageously presents, in the liquid state, a wetting angle on the patch 1 that is less than 90°. FIG. 4 illustrates the convention that is adopted here for measuring the wetting angle $\theta$ of the adhesive material 20 on the material of the patch 1. In these conditions, the adhesive material 20 penetrates to the bottom of the jumps in height 3 without retaining air bubbles. Several types of adhesive material may be used, in particular a glue that may be polymerized by irradiation or by thermal means, or of the latex type. Particularly successful implementations of the invention have been obtained with a glue that is acrylate-based and that can be polymerized by UV irradiation.

The difference between the respective optical refraction index values of the patch 1 and of the adhesive material 20 determines the modification in the optical power of the eyeglass that is provided by the patch. Respective values substantially equal to 1.59 and 1.50 for the material of the patch 1 and for the adhesive material 20 have made it possible to obtain optical power modifications greater than 6 diopters, in absolute values, even greater than 12 diopters. The lens 10 or 11 may be made of any material commonly used in the ophthalmic industry, to correct an ametropia or to produce a solar protection. The material of the ophthalmic lens may thus be of mineral or organic type. As an indication, but in a non-limiting way, the organic material that can be used in the context of the invention may be the materials conventionally used in optics and in ophthalmics. Suitable examples are substrates of the following types: polycarbonate; polyamide; polyimides; polysulfones; copolymers of poly(ethyleneterephthalate) and polycarbonate; polyolefins, notably polynorbornenes; polymers and copolymers of diethylene glycol bis(allylcarbonate); (meth)acrylic polymers and copolymers, notably (meth)acrylic polymers and copolymers derived from bisphenol-A; thio(meth)acrylic polymers and copolymers; urethane and thiourethane polymers and copolymers; epoxy polymers and copolymers and episulfide polymers and copolymers.

A patch according to the invention may advantageously be produced by injection of a transparent thermoplastic material, for example a polycarbonate-based material, into an injection mold. The mold is fed, in a manner known per se, by a material compression and injection device, which comprises a compression screw and a heating device. FIG. 5 diagrammatically illustrates such a mold 100. Two inserts, referenced 101 and 102, are placed in the mold. The insert 101 defines the face S1 of the patch 1 which comprises the jumps in height, and the insert 102 defines the smooth face S2. They are arranged facing each other and separated by a gap 103 that corresponds to the patch 1. The thermoplastic material is then injected into the mold 100 by an injection nozzle 104, so as to fill the gap 103. When the mold 100 is then opened, and after cooling, the patch 1 can be recovered.

It is understood that numerous adaptations may be introduced into the embodiments that have been described in detail hereinabove, while retaining at least some of the benefits of the invention. In particular, those skilled in the art will understand that the materials and values cited are cited purely by way of illustration, and can be modified.

The invention claimed is:

1. A patch intended to be fixed to a curved surface of an optical component to modify an optical power of said component, the patch comprising a refractive Fresnel lens formed by a series of Fresnel zones arranged one inside the other parallel to a smooth face of said patch and presenting jumps in height between two successive zones greater than five times an average wavelength of visible light, said jumps in height being measured in a direction perpendicular to the smooth face at an optical center of the patch, the patch being characterized in that, prior to being fixed on the curved surface, it has a generally bulging and substantially spherical shape with a mean radius of curvature between 135 mm and 53 mm, in addition to the jumps in height between successive Fresnel zones, and in that the jumps in height between successive Fresnel zones are situated on a generally convex face of the patch.

2. The patch as claimed in claim 1, having a mean radius of curvature between 88 mm and 53 mm, and preferably substantially equal to 66 mm.

3. The patch as claimed in claim 1, in which the jumps in height between successive Fresnel zones have variable magnitudes over the whole of the surface of the face of the patch.

4. The patch as claimed in claim 1, in which the jumps in height between successive Fresnel zones have substantially constant magnitudes within a circle of 10 mm radius surrounding the optical center of the patch.

5. The patch as claimed in claim 4, in which the jumps in height between successive Fresnel zones have magnitudes that increase in a peripheral part of the patch, as a distance increases from the optical center outside of the circle of 10 mm radius.

6. The patch as claimed in claim 4, in which the jumps in height between successive Fresnel zones within the circle have magnitudes between 5 µm and 50 µm, and the jumps in height between successive Fresnel zones outside the circle to a peripheral part of the patch have variable magnitudes between 5 µm and 250 µm.

7. The patch as claimed in claim 1, in which the jumps in height between successive Fresnel zones have substantially constant magnitudes over the whole of the surface of the patch.

8. The patch as claimed in claim 7, in which the jumps in height between successive Fresnel zones have magnitudes between 5 µm and 100 µm.

9. The patch as claimed in claim 1, in which the Fresnel zones have a dimension between 10 µm and 2 mm, in a radial direction passing through the optical center and perpendicular to an optical axis of the patch.

10. The patch as claimed in claim 1, having an average thickness less than 2 mm, measured perpendicularly to the smooth face of the patch.

11. The patch as claimed in claim 10, having an average thickness between 0.5 and 0.7 mm.

12. The patch as claimed in claim 1 comprising a transparent thermoplastic material.

13. The patch as claimed in claim 1 comprising a polycarbonate-based material.

14. An optical element comprising a base optical component and a patch as claimed in claims 1, fixed to said component.

15. The element as claimed in claim 14, in which a face of the patch comprising the jumps in height is facing the component.

16. The element as claimed in claim 14, in which the patch is fixed to the component by a layer of adhesive material arranged between said patch and said component.

17. The patch as claimed in claim 16, in which the patch comprises a material of optical refraction index substantially equal to 1.59 and the adhesive material has an optical refraction index substantially equal to 1.50.

18. The element as claimed in claim 16, in which the adhesive material is of the glue type that can be polymerized by irradiation or by thermal means, or of the latex type.

19. The element as claimed in claim 18, in which the glue is acrylate-based and can be polymerized by UV irradiation.

20. The element as claimed in claim 16, in which the adhesive material presents, in the liquid state, a wetting angle less than 90° on the patch.

21. The element as claimed in claim 14, in which the base component is an ophthalmic lens.

22. The element as claimed in claim 21, in which the base component is an ametropia-correcting ophthalmic lens.

23. The element as claimed in claim 21, in which the ophthalmic lens is tinted or partially reflecting.

24. The element as claimed in claim 14, in which the base component is a lens adapted to a pair of sunglasses.

25. The element as claimed in claim 21, in which the patch is fixed to a concave surface of the base component.

26. The element as claimed in claim 14, in which the base component is a mask lens, in particular a sun, ski or diving mask, or a visor, in particular a helmet visor.

27. A pair of glasses comprising at least one lens and one patch as claimed in claim 1, fixed to said lens.

28. The pair of glasses as claimed in claim 27, of the type of ametropia-correcting eyeglass or sunglasses.

29. The pair of glasses as claimed in claim 27, in which the patch is fixed to a rear face of the lens.

30. The pair of glasses as claimed in claim 27, in which the patch is fixed to the lens with a face of said patch comprising the jumps in height facing the lens.

31. The pair of glasses as claimed in claim 27, in which the patch is maintained on the lens by means of an adhesive material.

32. A method of fabricating a patch as claimed in claim 1, comprising the following steps:

arranging, facing each other in an injection mold, two inserts respectively defining the face with jumps in height and the smooth face of the patch, and separated by a gap corresponding to the patch to be fabricated; and injecting a transparent thermoplastic material into the mold so as to fill the gap between the two inserts.

* * * * *